July 21, 1925.
R. I. HUTT
VEHICLE SPRING
Filed Aug. 27, 1924
1,546,584
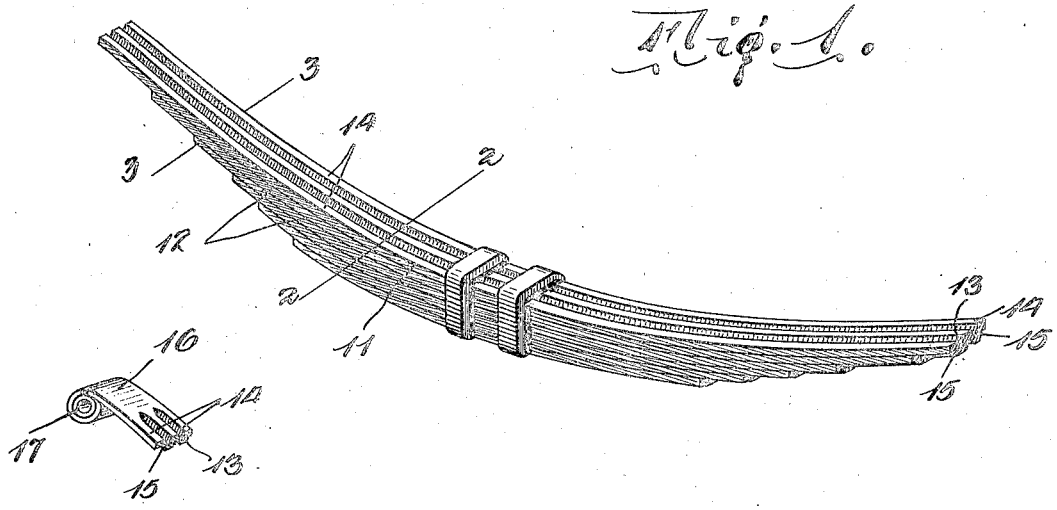
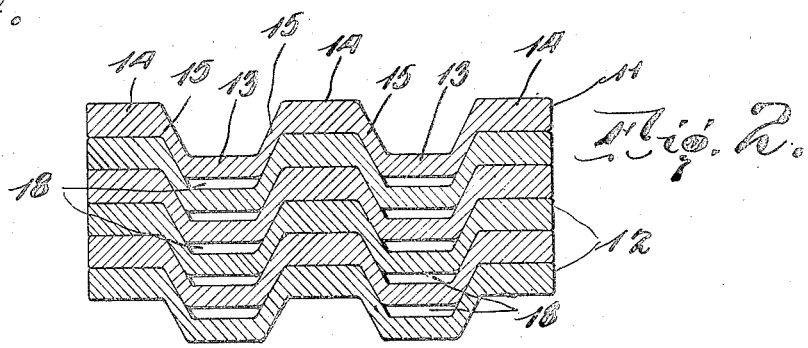
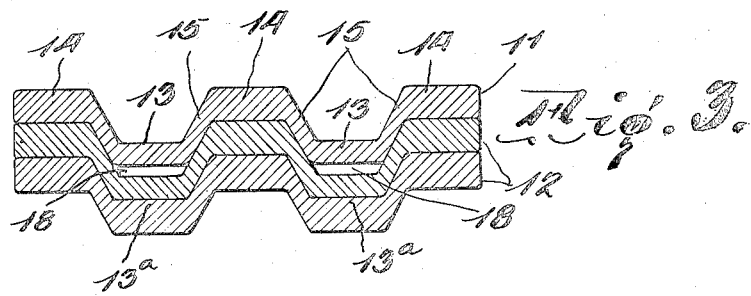
Inventor,
Reuben I. Hutt.
By Robert Watson
Attorney Patented July 21, 1925.

1,546,584

UNITED STATES PATENT OFFICE.

REUBEN I. HUTT, OF WILMINGTON, DELAWARE.

VEHICLE SPRING.

Application filed August 27, 1924. Serial No. 734,452.

*To all whom it may concern:*

Be it known that I, REUBEN I. HUTT, a citizen of the United States, residing at Wilmington, in the county of New Castle and State of Delaware, have invented certain new and useful Improvements in Vehicle Springs, of which the following is a specification.

This invention relates to springs and particularly to leaf springs, one embodiment of the invention being shown herein as applied to multiple leaf springs of the type used for supporting the bodies of automobiles and other vehicles, and for many other purposes. It will be evident, however, that the principles of the invention are not limited to the embodiment shown nor to the use of multiple leaves.

One of the objects of the invention is to provide a spring of light weight for the duty performed, thus lessening the amount of metal required for construction and presenting particular advantages in the case of automobiles in effecting a reduction of the unsprung weight.

A further object is to provide a spring of maximum durability with the portions thereof properly designed for their duties.

Still further objects of the invention and the principles of construction will be apparent from the following specification, when taken with the accompanying drawings, in which:

Fig. 1 is a view in perspective of a multiple leaf spring constituting one embodiment of the invention, one end of the spring being broken away to better show the construction;

Fig. 2 is a view in vertical cross section, taken on line 2—2 of Fig. 1;

Fig. 3 is a view in vertical cross section, taken on line 3—3 of Fig. 1 and showing a modified construction of the end of a leaf; and, Fig. 4 is a view in perspective, showing a modified form of the end of a main leaf.

Referring to the embodiment of the invention shown in Fig. 1, a multiple leaf spring is shown as built up of a main leaf 11, and auxiliary leaves 12, each successively shorter, as is the usual practice in vehicle springs of this type. It is well known that when a multiple leaf spring is bent, the metal at one face of the spring is placed under compression, while that at the opposite face of the spring is subjected to tension. It is also well known that the elastic limit of metals under compression is considerably higher than that of the elastic limit of the same metal under tension.

In order to provide a spring of minimum weight for maximum service and durability, it is therefore proposed to so construct the spring that the total area of metal under compression will bear to the total area of metal under tension substantially the same ratio as the elastic limit under tension bears to the elastic limit under compression, the portions of the spring being thus designed for the stresses imposed upon them.

In the structure shown, each of the leaves is longitudinally grooved, as best shown in Fig. 2, to form compression portions 13 at one side of the leaf and tension portions 14 at the opposite face, the compression portions being joined to the tension portions by web portions 15. The compression portions are substantially equal in width to the tension portions and are somewhat thinner, the web portions 15 being preferably no greater in thickness than that of the compression portions. It will be understood that the web portions 15, while a part of the leaf and necessary to rigidly connect the compression and tension portions, are relatively unimportant so far as taking the compression and tension strain, so that their thickness is comparatively immaterial so long as they impose upon the compression and tension portions the duties which they are to perform. If the metal used has an elastic limit under compression which is twice that of the metal under tension, the cross sectional area of the three tension members 14 should be twice that of the area of the two compression members 13, so that if the compression and tension members are of the same width as shown, the thickness of the compression members should be three-fourths that of the tension members.

It will be understood that the same result could be accomplished in a similar construction by making the width of the compression members three-fourths of that of the tension members and making them equal in thickness, and that if a greater or less number of grooves are formed, the relative width and thickness of the compression and tension portions would have to be altered.

From the standpoint of economical manufacture, it is preferable that the leaves be identical in cross section throughout, as shown in Fig. 1, with the web portions 15 inclined so that the leaves will nest one within the other. With this construction stock can be rolled to such cross section, cut into lengths and cambered. However, if it is desired to form the ends of the main leaf as shown in Fig. 4, such leaf may be separately formed or a length of grooved stock may be shaped at its ends to form a flat portion 16 into which the grooves disappear and which is curled over to form the eye 17.

If, as shown in Fig. 2, the compression portions are relatively thinner than the tension portions, spaces 18 will be formed in the assembled multiple leaf spring in which lubricant may be retained and any suitable system of supplying lubricant to said openings may be employed. The ends of the openings 18 may be closed in any suitable manner, as, for instance, by thickening the ends of the compression members 13, as shown at 13ª in Fig. 3.

A spring, whether single or multiple leaf, built in accordance with the invention described will have a maximum durability for its weight so that considerable metal can be saved in construction of the spring and a considerable saving in weight of the spring effected. This is of particular importance in the construction of automobiles in which it is desirable to reduce the unsprung weight to a minimum. The advantages thus gained in efficiency, lightness, saving of metal and, if desired, providing for lubrication, more than off-set an increased cost in shaping the leaves.

It will be obvious that many changes may be made in the design and construction of the parts without departing from the spirit of the invention which is defined in the following claims.

What I claim is:

1. A spring comprising a compression member and a tension member, the cross-sectional areas of said members being different and so proportioned that the elastic limit under compression of said compression member will substantially equal the elastic limit under tension of said tension member.

2. A spring comprising a leaf having integral compression and tension members, the cross-sectional areas of said members being substantially in inverse proportion to the elastic limit characteristics, under compression and tension, respectively, of the metal of which they are formed.

3. A spring comprising a leaf having compression members, and tension members offset from said compression members in the direction of bending and having a cross-sectional area sufficiently greater than that of said compression members to substantially compensate for the ratio of the elastic limits, under compression and tension, respectively, of the material of which the leaf is formed.

4. A spring comprising a leaf having compression and tension portions at opposite faces, said portions being alternately arranged and integrally connected by web portions, the cross-sectional areas of said portions being different and so proportioned that the elastic limit under compression of said compression portions will substantially equal the elastic limit under tension of said tension portions.

5. A spring comprising a plurality of leaves, each leaf being longitudinally grooved to form a flat compression portion at one face and a flat tension portion at the opposite face, with web portions integrally connecting said portions, said leaves being identical in cross section and nested with their grooves alined in the direction of bend of the spring, the total cross sectional area of the tension portions of each leaf being greater than that of the compression portions.

In testimony whereof I hereunto affix my signature.

REUBEN I. HUTT.